(12) United States Patent
Hu et al.

(10) Patent No.: US 8,398,887 B2
(45) Date of Patent: Mar. 19, 2013

(54) LIQUID CRYSTAL COMPOUNDS OF BUTYLENES

(75) Inventors: Baohua Hu, Yantai (CN); Hu Yuan, Yantai (CN); Yinbo Zhou, Yantai (CN); Xuesong Jiang, Yantai (CN); Tingting Zhang, Yantai (CN); Haichao Fu, Yantai (CN); Xueming Song, Yantai (CN)

(73) Assignee: Yantai Valiant Fine Chemicals Co., Ltd., Shandong (CN)

( * ) Notice: Subject to any disclaimer, the term of this patent is extended or adjusted under 35 U.S.C. 154(b) by 0 days.

(21) Appl. No.: 13/130,283

(22) PCT Filed: Jun. 3, 2009

(86) PCT No.: PCT/CN2009/000622
§ 371 (c)(1),
(2), (4) Date: Jul. 15, 2011

(87) PCT Pub. No.: WO2010/139092
PCT Pub. Date: Dec. 9, 2010

(65) Prior Publication Data
US 2011/0260106 A1    Oct. 27, 2011

(51) Int. Cl.
C09K 19/30 (2006.01)
C09K 19/12 (2006.01)
C07C 43/225 (2006.01)
C07C 25/24 (2006.01)

(52) U.S. Cl. .............. 252/299.63; 252/299.66; 570/127; 570/128; 570/131; 568/647

(58) Field of Classification Search ............. 568/647; 570/127, 131, 128; 252/299.63, 299.66
See application file for complete search history.

(56) References Cited

U.S. PATENT DOCUMENTS

| | | | |
|---|---|---|---|
| 6,231,934 B1 | 5/2001 | Kondo | |
| 7,846,514 B2 | 12/2010 | Shimada | |
| 8,003,006 B2 | 8/2011 | Kawakami et al. | |

FOREIGN PATENT DOCUMENTS

| | | |
|---|---|---|
| DE | 3509170 A1 | 9/1986 |
| JP | 09077703 A * | 3/1997 |
| JP | 3906487 B2 | 4/2007 |
| WO | 9827036 A1 | 6/1998 |
| WO | 2006098366 | 9/2006 |
| WO | 2008090780 | 7/2008 |

OTHER PUBLICATIONS

English abstract for JP0907703 provided by Derwent-ACC-No. 1997-241677.*
PCT International Search report mailed date Mar. 11, 2010 for PCT International Application No. PCT/CN2009/000622.
Kelly, S.M. Four unit linking groups IV Liquid crystals of positive dielectric anisotropy. Liquid Crystals 1991, vol. 10, No. 2, pp. 273-287, ISSN 0267-8292.
Wiktionary entry for fluoroalkyl; dowloaded from the Internet on Nov. 1, 2012; downloaded from <http://en.wiktionary.org/wiki/fluoroalkyl>, last modified on Nov. 7, 2008.

* cited by examiner

*Primary Examiner* — Shean C Wu
(74) *Attorney, Agent, or Firm* — Joshua D. Isenberg; JDI Patent

(57) ABSTRACT

A nematic phase liquid crystal compound with negative dielectric constant has a structure represented by

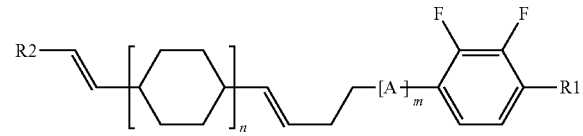

wherein R1 represents a hydrogen atom or linear alkyl having 1 to 8 carbon atoms or linear alkenyl having 1-8 carbon atoms, or an alkoxy or alykenoxy formed by substituting one or nonadjacent two $CH_2$ in the linear alkyl or alkenyl with oxygen atom, wherein 0 to 4 hydrogen atoms of R1 group can be substituted with fluorine; R2 represents a hydrogen atom or linear alkyl having 1 to 8 carbon atoms, or R2 represents a linear fluoroalkyl having 1 to 8 carbon atoms, in which group 1 to 4 hydrogens can be substituted with fluorine atoms; A represents a benzene ring or 1,4-cyclohexane ring, if A is a benzene ring 0 to 4 hydrogen atoms on the benzene ring may be substituted with fluorine; n=1 to 2, and m=0 to 2.

4 Claims, No Drawings

LIQUID CRYSTAL COMPOUNDS OF BUTYLENES

FIELD OF THE INVENTION

The present invention relates to liquid crystal compounds useful as liquid crystal display materials having a negative dielectric constant and to mixed liquid crystal materials using such compounds.

BACKGROUND OF THE INVENTION

Liquid crystal displays are widely used for portable computer, television, various domestic electrical appliance displays, industrial display instruments, automobile meters, desktop monitors, aerospace field and so on due to the characteristics of low energy consumption, long service life, low affect to human bodies and environment, and convenient for carrying. The common working modes of liquid crystals comprise: TN (twist nematic), STN (supertwist nematic), TFT (thin film transistor), GH (guest-host) and so on.

Among others, TFT uses thin film transistor array to drive the liquid crystal molecules directly, which eliminates the cross distortion effect, thus the capacity for the displayed information is large. In combination with the use of liquid crystal material with low viscosity, the response speed of TFT is extremely increased and is able to satisfy the need by video image display, hereby the TFT display mode has currently become a mainstream display mode for high grade displays. The TFT display modes are in turn divided into IPS (in-plane switching), VA (vertical arrangement), TN (twist nematic phase) modes. Among others, the VA mode as well as the MVA and PVA modes developed therefrom all use liquid crystal materials with negative dielectric constants. The VA, MVA and PVA display modes driven by active matrices are relatively competitive for display with high response speed, wide viewing angle and high definition. Therefore, the chemosynthesis experts make their constant efforts to synthesize negative liquid crystals having new structures and good performances.

The liquid crystal materials used for VA display mode require low-voltage driving, high response speed and relatively wide operating temperature range, especially require stable properties in low temperature status, which demands the liquid crystal having characteristics of absolutely large dielectric constant, low viscosity, high clearing point, low melting point and so on. The product of birefringence (Δn) and cell thickness (d) relates to the wavelength of incident light (γ), thus it will not be appropriate to achieve high response speed by largely reducing the cell thickness. In general, the response speed is increased by decreasing viscosity; meanwhile, the response speed can also be increased by increasing the elastic constant of the liquid crystal materials.

As the displays set requirements on various indexes of the liquid crystals, a single compound is difficult to satisfy all the strict requirements in practical applications. The functional shortcomings can be complemented by scientifically compounding different liquid crystal monomers, so as to achieve the purpose of enhancing the display property, which requires the liquid crystal materials mixed together having good miscibility necessarily. Such liquid crystal is affected by the environment little, which will not result in either crystallization or occurrence of smectic phase at a lower temperature, so as to widen the applicability ranges of the liquid crystal.

Generally, the incorporation of separate unsaturated double bonds into the molecules of a liquid crystal can increase the elastic constant of the liquid crystal, increase the solubility property, result in excellent fluidity at low temperatures, increase the clearing point and decrease the crystallization temperature. The incorporation of soft groups in the molecules can decrease the possibility of formation of the smectic phase, and increase the solubility of the liquid crystal.

Patent 1, WO9827036A1, discloses a compound comprising butane as a bridge in the structure, whilst it never further concerns liquid crystals of butylenes. Patent 1 provides the properties and related data of the compound, but the range of the liquid crystals is not broad enough.

Patent 2, WO2008090780, relates to liquid crystals of butylenes in the structure, while it does not concern either the negative liquid crystals or the compounds of the present invention.

The present invention develops a series of new negative liquid crystals, having a relatively broad range for the phase transition of liquid crystal and good chemical stability. The addition of the new liquid crystals in mixed liquid crystals can reduce the solidifying point, increase the clearing point, and can increase the absolute value of the negative dielectric constant, so as to be much valuable in applications.

SUMMARY OF THE INVENTION

The invention provides a new valuable negative liquid crystal material having low viscosity, large absolute value of dielectric constant, good chemical stability and stability to illuminated and high temperature environment. The invention also provides a process for synthesizing the liquid crystal.

The compound is represented by the following structural formula (1);

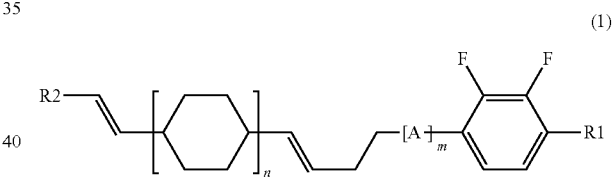

wherein, R1 represents hydrogen atom or a linear alkyl having 1 to 8 carbon atoms or a linear alkenyl having 2 to 8 carbon atoms, or alternatively, R1 represents an alkoxy or alykenoxy formed by substituting one or nonadjacent two $CH_2$ in the above linear alkyl or linear alkenyl with an oxygen atom, in which group 0 to 4 hydrogen atoms can be substituted with fluorine. R2 represents hydrogen atom or a linear alkyl having 1 to 8 carbon atoms, in which group 0 to 4 hydrogen atoms can be substituted with fluorine. A represents a benzene ring or 1,4-di-substituted cyclohexane ring, wherein if A is the benzene ring then there may be 0 to 4 hydrogen atoms on the benzene ring being substituted with fluorine; n=1 to 2, m=0 to 2.

The series of compounds are synthesized by the following process.

Take

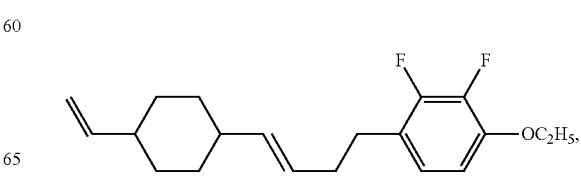

namely 1-(4-vinylcyclohexyl)-4-(4-ethoxy 2, 3-difluorophenyl)-butylene, as an example.

1. Syntheses of Aldehyde

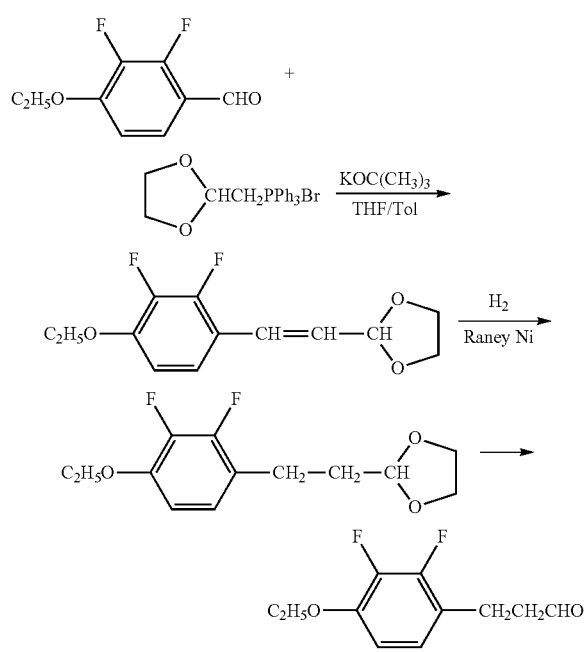

2. Syntheses of Phosphine Salt

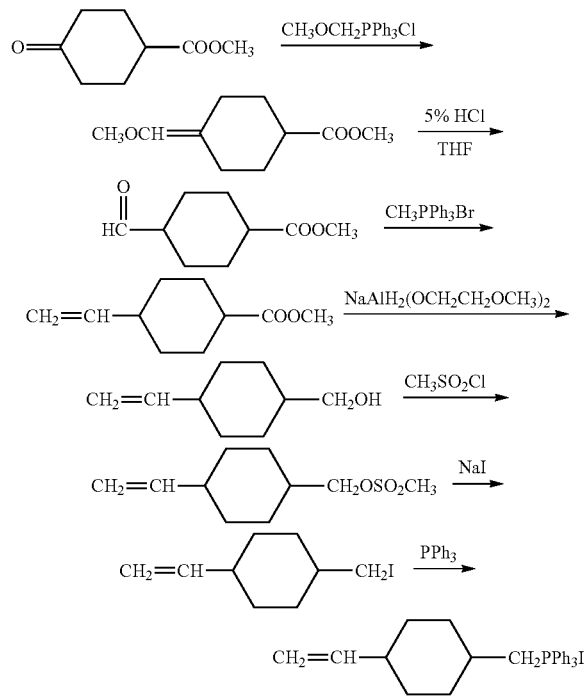

3. Syntheses of 1-(4-vinylcyclohexyl)-4-(4-ethoxy-2,3 difluorophenyl)-butylene

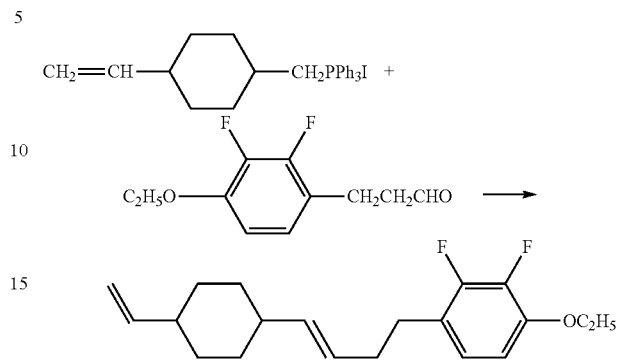

In the preparation process of such butylenes, the present invention uses the corresponding phosphine salt and aldehyde to subject a WITTIG reaction in the presence of a base, to produce mixed olefins of cis-/trans-forms, which are then further converted into a tans-olefin. In the WITTIG reaction, the base used can be potassium tert-butoxide, sodium hydride, butyl lithium, phenyl lithium and so on, preferably potassium tert-butoxide. The reaction solvent can be selected from ether solvents or aromatic solvents, wherein the ether solvents can be selected from tetrahydrofuran, ethyl ether, methyl tert-butyl ether, dioxane and so on, preferably tetrahydrofuran or methyl tert-butyl ether, and the aromatic solvents can be selected from toluene, xylene and so on. The solvents can be used alone or can be used as a mixture of two or more of the solvents.

The reaction temperature is preferably in the range of from −30 to 40° C., more preferably from −20 to 0° C. The product obtained can be extracted by a solvent selected from ethers, aromatics, halohydrocarbons and the like, wherein the ether solvents can be selected from ethyl ether, methyl tert-butyl ether and so on, the aromatic solvents can be selected from toluene, xylene, halo-benzene and so on, and the halohydrocarbons can be dichloroethane, methylene chloride, chloroform, carbon tetrachloride and so on.

In the reaction of converting the cis-olefine into the trans-olefine, benzenesulfinic acid or a mixture of sodium benzenesulphinate and acid can be used. The solvent used is an alcohol solvent or an aromatic solvent, wherein the alcohol solvent can be a lower fatty alcohol such as methanol, ethanol, propanol, isopropanol and so on, preferably ethanol. The aromatic solvents can be selected from toluene, xylene and so on, preferably toluene. The solvents can be used alone or used as a mixture of two or more thereof.

EMBODIMENTS OF THE INVENTION

The following exemplary examples further illustrate the present invention in detail, but the present invention is never restricted to these examples. The structures of compounds can be determined by means of nuclear magnetic resonance (NMR), gas chromatography-mass spectrometry (GC-MS) and so on.

The followings are the abbreviations for certain usual compounds, which are useful for purpose of illustrating the invention only.

THF Tetrahydrofuran
DMF N,N-dimethyl formamide
t-BUOK Potassium tert-butoxide

MS-CL Methylsulfonyl chloride
MTC (Methoxymethyl)triphenylphosphonium chloride
TPEBr (1,3-Dioxolan-2-ylmethyl)triphenylphosphonium bromide
DMAP 4-N,N-4-dimethylamiopryidine
PPh3 Triphenyl phosphine
The followings are symbols showing the structures of the inventive compounds
V Represents ethylene
C Represents 1,4-di-substituted cyclohexane
W Represents 2,3-difluorobenzene
O Represents oxygen atom
1~12 Represents a linear alkyl having 1 to 12 carbon atoms
The followings are the structures and abbreviations thereof for the liquid crystal compounds used in the invention;

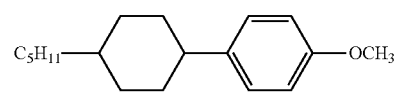
PCH501

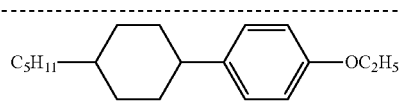
PCH502

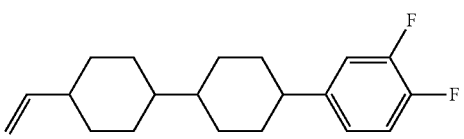
VHHPFF

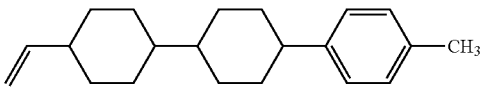
VHHP1

Example 1

Preparation of 1-(trans-vinylcyclohexyl)-4-(4-ethoxy-2,3 difluorophenyl)-butylene (VCV2W02)

I. Preparation of trans-4-vinylcyclohexyliodomethane triphenyl phosphonium salt

1. Preparation of 4-methoxymethylenecyclohexyl formic acid methyl ester

A 2 L three-necked flask equipped with thermometer, stirrer, liquid sealing, $N_2$ protection and drying tube was used. 285.4 g of MTC and 400 ml of THF were added. The flask was placed into a tank with cold bath at −15° C., to obtain a white suspension. The temperature was controlled to be between −5° C. and −10° C., and a solution of 93.3 g of t-BUOK in 400 ml of THF was added dropwise. The colour was changed into bright orange firstly, and then changed gradually into dark. After the completion of addition by dropwise, the reaction was conducted for 0.5 hour. A solution of 100 g of 4-keto-cyclohexyl formic acid methyl ester in 100 ml of THF was added dropwise at a temperature of between −5° C. and −10° C., with the colour faded gradually. After the completion of addition, the cooling was shut off, the temperature was raised naturally to about 0° C. and the reaction was conducted for 1 hour under thermal retardation. A 200 ml aqueous solution of 10 g $NH_4Cl$ was added, and the temperature was controlled to be less than 10° C. 500 ml of $CH_2Cl_2$ was added for extraction. If there is undissolved substance, a small amount of water was added to dissolve it, and washed with water till neutrality. The organic phase was tan in color, dried with anhydrous $Na_2SO_4$, and the solvent was removed by a rotary evaporator, so as to obtain a liquid-solid mixture. 500 ml of n-hexane was added, pumping filtrated, and leached with 100 ml of n-hexane twice. The filtrate was passed through a silicagel column, and the solvent was removed by a rotary evaporator, to obtain 113.5 g of pale yellow liquid. Yield: 96%, GC purity: 95.9%.

2. Preparation of 4-formylcyclohexyl formic acid methyl ester

A 1 liter three-necked flask, equipped with thermometer, stirrer, $N_2$ protection and ice-water bath, was used. 108.9 g of the product from the previous step and 330 ml of THF were added, 110 ml of 5% hydrochloric acid was added dropwise, and the temperature was controlled to be less than 10° C. After the completion of addition, the temperature was raised to 30° C. by heating, and kept at that temperature for 4 hours. 400 ml of water was added, extracted with 300 ml of $CH_2Cl_2$, washed with water till neutrality, dried by anhydrous $Na_2SO_4$, and the solvent was removed by a rotary evaporator, to obtain 96.8 g of pale yellow liquid. Yield: 96.0%, GC purity: 87.8%.

3. Preparation of 4-vinylcyclohexyl formic acid methyl ester

A 2 liter three-necked flask, equipped with thermometer, stirrer, liquid sealing, $N_2$ protection and drying tube, was used. 213.5 g of $CH_3PPh_3Br$ and 400 ml of THF were added. The flask was placed into a tank with cold bath at a temperature of −15° C. to obtain a white suspension. A solution of 65.8 g t-BUOK in 300 ml THF was added dropwise, and the temperature was controlled to be between −5° C. and −10° C. The colour was changed into yellow. After the completion of addition, the reaction was conducted for 0.5 h. A solution of 84.7 g aldehyde obtained from the previous step in 100 ml THF was added dropwise, the temperature was controlled to be between −5° C. and −10° C., and the color was changed to be dark gradually. After the completion of addition, the cooling was shut off, the temperature was raised naturally to about 0° C. and the reaction was conducted for 1 hour. A 200 ml of aqueous solution of 5 g $NH_4Cl$ was added, and the temperature was controlled to be less than 10° C. 500 ml of $CH_2Cl_2$ was added for extraction. If there is undissolved substance, a small amount of water was added to dissolve it, washed with water till neutrality, dried with anhydrous $Na_2SO_4$, and the solvent was removed by a rotary evaporator, so as to obtain a liquid-solid mixture. 500 ml of n-hexane was added, pumping filtrated, and leached with 50 ml of n-hexane twice. The filtrate was passed through a silicagel column, and the solvent was removed by a rotary evaporator, to obtain 89.4 g of pale yellow liquid. GC purity: 92.2%, wherein cis 36.3%, and trans 55.9%.

4. Preparation of 4-vinylcyclohexylcarbinol

A 1 liter three-necked flask, equipped with thermometer, stirrer and $N_2$ protection, was used. 46.2 g of 4-vinylcyclohexyl formic acid methyl ester and 140 ml of toluene were added to obtain a pale yellow solution. The temperature was decreased with an ice-water bath. A solution of sodium bis (2-methoxyethoxy)aluminum hydride in toluene in an amount of 1.2 times higher than the theory amount was added dropwise, and the temperature was controlled to be less than 30° C. After the completion of addition, the temperature was controlled to be at 30° C., and kept at that temperature for 2 hours. The mixture was poured into 220 g of an aqueous solution of 20% NaOH, the temperature was controlled to be less than 30° C., and stirred for half an hour. The organic phase was separated out, the aqueous phase was extracted twice with 300 ml of THF, the organic phases were combined, and the solvent was removed by a rotary evaporator, to obtain 42.1 g of pale yellow liquid. GC purity: 94.4%, wherein cis 38.0%, and trans 56.4%.

3. Preparation of trans-4-vinylcyclohexylmethyl methanesulfonate

A 1 liter three-necked flask, equipped with thermometer, stirrer and $N_2$ protection, was used. 38.5 g of the alcohol obtained from the previous step, 32.6 g of pyridine, 1.7 g of DMAP and 220 ml $CH_2Cl_2$ were added, and the temperature was decreased with a ice-water bath. MS-Cl in an amount of 1.2 times higher than the theory amount was added dropwise, and the temperature was controlled to be less than 30° C. After the completion of addition, reflux was conducted under heating for 5 hours, and the solution was changed into a pale yellow and clear solution. 200 ml of water was added, and the organic phase was separated out. 100 ml of 5% hydrochloric acid and 100 ml of water were further added into the organic phase, stirred for 10 minutes, and the organic phase was separated out. The organic phase was washed with water till neutrality, dried by anhydrous $Na_2SO_4$, and the solvent was removed by a rotary evaporator, to obtain 63.9 g of pale yellow liquid. Cyclohexane was added. The mixture was passed through a silicagel column, and the solvent was removed by a rotary evaporator, to obtain 48.0 g of pale yellow liquid. Yield: 80.2%. Recrystallization was conducted with 90 ml of n-hexane, and filtration was conducted at −30° C., to obtain 22.0 g of product. GC purity: 97.9%.

6. Preparation of trans-4-vinylcyclohexyl iodomethane

A 1 liter three-necked flask, equipped with thermometer, stirrer and $N_2$ protection, was used. 53.2 g of the ester obtained from the previous step, 54.9 g of sodium iodide and 500 ml of butanone were added, refluxed under heating for 6 hours, and the reaction liquor was thickened gradually. 26 g of $NaHSO_3$ and 200 ml of water were added, and stirred for half an hour. 300 ml of toluene was added for extraction, washed with water till neutrality, and the solvent was removed by a rotary evaporator, to obtain 60.0 g of pale yellow liquid. GC purity: 98.2%.

7. Preparation of trans-4-vinylcyclohexyl iodomethane triphenyl phsophonium salt A 1 liter three-necked flask, equipped with thermometer, stirrer and $N_2$ protection, was used. 60.0 g of the trans-4-vinylcyclohexyl iodomethane obtained from the previous step, 76.7 g of triphenylphosphine and 200 ml of acetonitrile were added, reacted with heating and reflux for 38 hours, and the reaction liquor was changed into transparent gradually. The temperature was cooled down to room temperature, and 250 ml of $CH_2Cl_2$ and 1 l of water were added. The organic layer (underlayer) was separated out, the aqueous phase was extracted by adding 200 ml of $CH_2Cl_2$, the organic phases were combined, washed with water till neutrality, dried by adding anhydrous $Na_2SO_4$, and the solvent was removed by a rotary evaporator, to obtain 158 g of crude product (viscous liquid). 300 ml of acetone was added for dissolution, the solid was slowly precipitated out in the flask, and the flask was placed into a freezer over night. The next day, the solid was filtrated out at −20° C., the filter cake was leached with chilled acetone, and dried in vacuo at room temperature, to obtain 91.1 g of white solid. Yield: 73.0%.

II. Preparation of 2,3-difluoro-4-ethoxyphenylpropyl aldehyde

1. Preparation of 2,3-difluoro-4-ethoxyphenyl propylene ethylene glycol acetal A 2 l three-necked flask equipped with a water separator and $N_2$ protection was used. 268 g of TPEBr and 1000 ml of toluene were added. The inside temperature was raised to 110° C. by oil-bath heating, refluxed and water separated till no water being distilled off. The temperature was decreased to below −5° C., a mixed liquor of 70 g of t-BUOK and 280 ml of tetrahydrofuran was added dropwise at a temperature below 5° C., and the color of the system was changed into yellow. After the completion of addition, the temperature was decreased to below −5° C. again. The temperature was controlled to be below 0° C. and a mixed liquor of 93 g of 2,3-difluoro-4-ethoxybenzaldehyde, 60 ml of THF and 200 ml of toluene was added dropwise. After the completion of addition, the reaction was thermal retarded at a temperature below 0° C. for 2 hours. The system was added with 200 ml of water for hydrolysis. The system was transferred to a separating funnel to separate out the organic phase. The organic phase was washed with water till neutrality. The organic phase was further transferred to a 1 liter one-necked flask, and removed off solvent under reduced pressure. 400 ml of petroleum ether was added to obtain a liquid-solid mixture. The liquid-solid mixture obtained was pumping filtrated, and the filtrate was passed through a silica gel column, and eluted with petroleum ether. The solvent was removed under reduced pressure to obtain 114 g of white solid. Yield: 90.0%, GC: cis 70.4%, and trans 27.1%.

2. Preparation of 2,3-difluoro-4-ethoxyphenylpropyl aldehyde ethylene acetal 112 g of 2,3-difluoro-4-ethoxyphenyl propylene ethylene glycol acetal obtained from the previous step, 34 g of Raney nickel, and 600 ml of toluene were hydrogenated at a temperature of 30° C. under a pressure of from 5 to 10 atm for 8 hours. The obtained substance was pumping filtrated, the catalyst was removed, and the solvent was removed under a reduced pressure to obtain a product as white solid. Yield: 94.0%, GC purity: 96.3%.

3. Preparation of 2,3-difluoro-4-ethoxyphenylpropyl aldehyde

A 1 liter three-necked flask equipped with $N_2$ protection was used. 77.4 g (0.3 mol) of 2,3-difluoro-4-ethoxyphenylpropyl aldehyde ethylene acetal, 154.8 ml of formic acid and 240 ml of toluene were added. Reaction was conducted at a temperature of between 60 to 70° C., water was added, the aqueous phase was separated out, washed with water till neutrality, dried by adding anhydrous $Na_2SO_4$, and a part of the solvent was removed by a rotary evaporator. The product obtained could be used directly.

III. Preparation of 1-(trans-4-vinylcyclohexyl)-4-(4-ethoxy-2,3-difluorophenyl)-butylene (VCV2W02)

1. Preparation of VCV2W02

A 1 liter three-necked flask equipped use $N_2$ protection was used. 125.6 g of trans-4-vinylcyclohexyliodomethane triphenyl phsophonium salt and 370 ml of THF were added, stirred and the temperature was decreased. A solution formulated by 30.2 g of t-BUOK and 120 g of THF was added dropwise, and the temperature was controlled to be less than −10° C. After the completion of addition, thermal retardation was conducted for 0.5 hour. A solution of 2,3-difluoro-4-ethoxyphenylpropyl aldehyde obtained from the previous step was added dropwise, and the temperature was controlled to be less than −5° C. After the completion of addition by dropwise, thermal retardation was conducted for 1 hour. Water and 300 ml of toluene were added, washed with water till neutrality, the solvent was removed by a rotary evaporator, and 300 ml of petroleum ether was added. No solid was precipitated out. The supernatant organic layer was separated out, the organic phase was passed through a silicagel column, the solvent was removed by a rotary evaporator, and the solvent was removed to obtain 32.0 g of crude product.

2. Transformation of VCV2W02

A 500 ml of three-necked flask was used, and 32.0 g of VCV2W02 crude product, 10 g of sodium benzene sulphinate, 1.6 g of concentrated hydrochloric acid, 1.6 g of water and 320 ml of toluene were added. The reaction was conducted at a temperature of between 50 and 60° C. for 8 hours, washed with water till neutrality, the solvent was removed by a rotary evaporator, passed through a silicagel column, leached with petroleum ether, and recrystallized with 60 ml of anhydrous ethanol three times, to obtain 14.1 g of product. Purity: 99.7%, phase transition point: Cr31.5 Iso.

Example 2

Preparation of

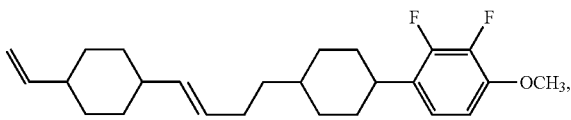

namely 1-(trans-4-vinylcyclohexyl)-4-(trans-4-(4'-ethoxy-2',3'-difluorophenyl)cyclohexyl)-butylene (VCV2CW01)

I. Preparation of trans-4-(4'-methoxy-2',3'-difluorophenyl)cyclohexylpropyl aldehyde

1. Preparation of trans-4-(4'-methoxy-2',3'-difluorophenyl)cyclohexyl acrolein ethylene acetal A 2 l three-necked flask equipped with a water separator was used. 96 g of TPEBr and 400 ml of toluene were added. The inside temperature was raised to 110° C. by oil-bath heating, refluxed and water separated till no water being distilled off. The temperature was decreased to below 5° C., a mixed liquor formulated by 24.1 g of t-BUOK and 100 ml of THF was added dropwise at a temperature controlled below 5° C. After the completion of addition, the temperature was decreased to below −5° C. again. A mixed solution of trans-4-(4'-methoxy-2',3'-difluorophenyl)cyclohexanealdehyde and 500 ml of toluene was added dropwise at a temperature below 0° C. After the completion of addition, the reaction was conducted at a temperature below 0° C. with thermal retardation for 2 hours. 200 ml of water was added to the system for hydrolysis. The system was transferred to a separatory funnel to separate out the organic phase. The organic phase was washed with water till neutrality, and the organic phase was transferred to a 1 liter one-necked flask, the solvent was removed under a reduced pressure, and 2 ml anhydrous ethanol was added per g of substance obtained, to obtain 25 g of product. Yield: 44.9% (based on the ketone), GC purity: 90.5%.

2. Preparation of trans-4-(4'-methoxy-2',3'-difluorophenyl)cyclohexylpropyl aldehyde ethylene acetal 25 g of trans-4-(4'-methoxy-2',3'-difluorophenyl)cyclohexyl acrolein ethylene acetal, 10 g of Raney Ni, and 500 ml of toluene were added into a 2 liter autoclave. The reaction was conducted with thermal retardation under a pressure of 10 atm and at a temperature of 30° C. The materials were taken out, the Raney nickel was filtered off, the solvent was removed, and the product obtained could be used in the next step directly.

3. Preparation of trans-4-(4'-methoxy-2',3'-difluorophenyl)cyclohexylpropyl aldehyde A 2 liter three-necked flask was used. 15.5 g of trans-4-(4'-methoxy-2',3'-difluorophenyl)cyclohexylpropyl aldehyde ethylene acetal, 31 ml of formic acid and 46.5 ml of toluene were added, heated by oil-bath to reflux, the reflux was kept for 2 hours, stirring was stopped, and cooled to room temperature. The solution was poured into a separatory funnel, the aqueous phase was separated, the organic phase was washed with 500 ml of water twice, a pre-formulated solution of 5% potassium carbonate was added to adjust pH to about 7, further washed with 500 ml of water three times till neutrality, dried with anhydrous sodium sulfate, the solvent was removed, and the product obtained could be used in the next step directly.

III. Preparation of 1-(trans-4-vinylcyclohexyl)-4-(trans-4-(4'-ethoxy-2',3'-difluorophenyl)cyclohexyl)-butylene VCV2CW01

1. Preparation of VCV2CW01

A 500 ml three-necked flask was used. 26.8 g of phosphine salt and 200 ml of n-hexane were added, heated by oil-bath, refluxed and water separated till no water being distilled off. The temperature was decreased to −15° C., a solution of 5.86 g of potassium tert-butoxide in 23.5 ml of THF was added dropwise, and the temperature was controlled to be less than −10° C. After the addition, the temperature was kept at −10° C. for 30 minutes. A mixed solution formulated by 13.4 g of trans-4-(4'-methoxy-2',3'-difluorophenyl)cyclohexylpropyl aldehyde and 200 ml of THF was further added dropwise at a temperature controlled below −10° C. After the addition, the temperature was kept at −10° C. for 2 hours. After the completion of the reaction, the reaction liquor was poured into 200 ml of water and 200 ml of toluene. Layers separated, the aqueous phase was isolated off, the organic phase was washed with water till neutrality, the solvent was removed, and the product was added with 100 ml of petroleum ether, upon which there was solid precipitated. The mixture obtained was pumping filtrated, leached with petroleum ether, the filtrate was passed through silicagel column, and the solvent was removed to obtain 10.0 g of product.

2. Transformation of VCV2CW01

A 500 ml three-necked flask was used. 10.0 g of crude product of VCV2CW01, 2.6 g of sodium benzene sulphinate, 1.2 g of concentrated hydrochloric acid and 100 ml of toluene were added. The oil bath was heated to a temperature between 50 and 60° C., and kept at that temperature for reaction for 8 hours. After the completion of reaction, the reactants were added with 100 ml of water, and transferred into a separatory funnel. The organic phase was separated out, washed with water till neutrality, dried with anhydrous sodium sulfate, passed through a silicagel column, and the solvent was removed to obtain 10.0 g of product. The product was recrystallized three times with 0.5 ml of toluene per g of product and 2 ml of anhydrous ethanol per g of product, and filtrated at a temperature of −20° C. to obtain 5.5 g of product. Purity: 99.9%, phase transition point: Cr71.6N118.0 Iso.

The process above was also used to synthesize the following liquid crystals:

1-(trans-4-vinylcyclohexyl)-4-(4-methoxy-2,3-difluorophenyl)-butylene 1-(trans-4-vinylcyclohexyl)-4-(4-butoxy-2,3-difluorophenyl)-butylene 1-(trans-4-vinylcyclohexyl)-4-(trans-4-(4'-ethoxy-2',3'-difluorophenyl)cyclohexyl)-butylene 1-(trans-4-vinylcyclohexyl)-4-(trans-4-(4'-butoxy-2',3'-difluorophenyl)cyclohexyl)-butylene Listing of Properties

| Name | Phase transition | Δn | Δε | k11 | γ (mPas) |
|---|---|---|---|---|---|
| VCV2W01 | Cr23.1Iso | 0.0907 | | | |
| VCV2W02 | Cr31.5Iso | | | | |
| VCV2W04 | Cr5.1Iso | 0.0938 | | | |
| VCV2CW01 | Cr71.6N118.0 Iso | | | | |
| VCV2CW02 | Cr64.4N126.1 Iso | 0.11 | −2.65 | 8.6 | 400 |
| VCV2CW04 | Cr36.1S53.3N119.0 Iso | | | | |

Wherein:
Δn-birefringence;
Δε-dielectric constant anisotropy;
K11-splay elastic coefficient;
γ-Torsion viscosity Structural identification (NMR) is as follows: instrument: av400, solvent: CDCl$_3$, frequency: 400M Hz ($^1$H NMR), 100M Hz ($^{13}$C NMR)

1.

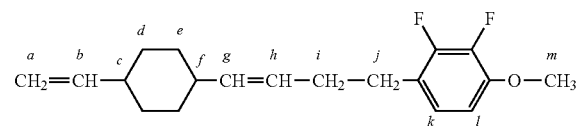

$^1$H NMR spectrum:
a 5.3-5.4 (2H, m); b 4.8-4.9 (1H, d); c, f 1.79-1.87 (2H, m); d, e 1.01-1.15 (4H, m) 1.59-1.77 (4H, m) (8 hydrogens of methylene on the cyclohexyl); g 4.92-4.97 (1H, m, J=17.32 Hz, indicating that the double bond is trans-substituted); h 5.7-5.8 (1H, m); i 2.21-2.26 (2H, m); j 2.6 (2H, t); k 6.61-6.65 (1H, m); l 6.78-6.82 (1H, m); m 3.8 (3H, s)

$^{13}$C NMR spectrum:
a 111.7; b, g, h 126.3, 137.2, 144.4; c, f 40.3, 41.2; d, e 32.1, 32.6; i, j 28.7, 33.1; k 107.8; l 123.4; m 56.5; Carbon atom bonding to the fluorine (meta-position relative to the methoxy) 139.9-142.5 (q, J=245 Hz); Carbon atom bonding to the fluorine (ortho-position relative to the methoxy) 148.4-150.9 (q, J=244 Hz); Carbon atom bonding to the oxygen on the benzene ring 147.0-147.1 (q); Carbon atom bonding to the methylene on the benzene ring 122.6-122.8 (d)

2.

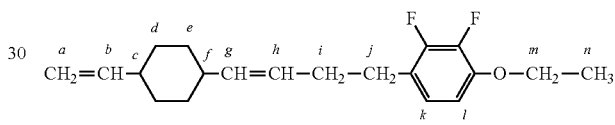

$^1$H NMR:
a 5.29-5.41 (2H, m); b 4.85-4.89 (1H, m); c, f 1.79-1.87 (2H, m); d, e 1.01-1.15 (4H, m) 1.70-1.77 (4H, m) (8 hydrogens of methylene on the cyclohexyl); g 4.92-4.97 (1H, m, J=17.28 Hz, indicating that the double bond is trans-substituted); h 5.72-5.80 (1H, m); i 2.21-2.26 (2H, m); j 2.63 (2H, t); k 6.60-6.65 (1H, m); l 6.75-6.80 (1H, m); m 4.04-4.09 (2H, q, J=7 Hz, indicating the hydrogen on methylene of the ethyl); n 1.42 (3H, t, J=7 Hz, indicating the hydrogen on methyl of the ethyl)

$^{13}$C NMR spectrum:
a 111.7; b, g, h 126.3, 137.2, 144.4; c, f 28.67, 33.14; d, e 32.12, 32.58; i, j 40.29, 41.25; k 109.2; l 123.3-123.4 (t); m 65.32; n 14.70; Carbon atom bonding to the fluorine (meta-position relative to the methoxy) 140.2-142.8 (q, J=245 Hz); Carbon atom bonding to the fluorine (ortho-position relative to the methoxy) 148.5-151.0 (q, J=244 Hz); Carbon atom bonding to the oxygen on the benzene ring 146.3-146.4 (q); Carbon atom bonding to the methylene on the benzene ring 122.57-122.71 (d)

3.

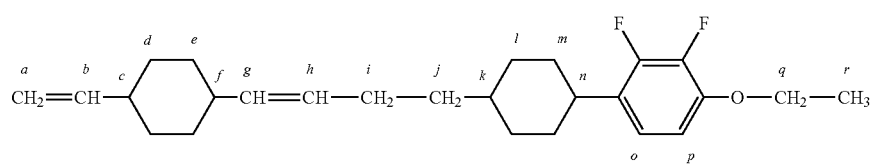

¹H NMR spectrum:
a 5.32-5.42 (2H, m); b 4.87-4.90 (1H, d); c, f 1-2 (2H, m); d, e 1-2 (8H, m) (8 hydrogens of methylene on the cyclohexyl); g 4.94-4.98 (1H, d, J=17.32 Hz, indicating that the double bond is trans-substituted); h 5.73-5.82 (1H, m); i, j 1-2 (4H, m); k 1-2 (1 H, m); l, m 1-2 (8H, m); n 2.70-2.77 (1H, m); o 6.63-6.68 (1H, m); p 6.81-6.85 (1H, m); q 4.05-4.11 (2H, q, J=6.96 Hz, indicating the hydrogen on methylene of the ethyl); r 1.43 (3H, t, J=6.96 Hz, indicating the hydrogen on methyl of the ethyl)

¹³C NMR spectrum:
a 110.7; b, g, h 128.1, 136.0, 144.6; o 109.4; p 120.4-120.5 (t); q 65.39; r 14.80; Carbon atom bonding to the fluorine (ortho-position relative to the methoxy) 148.1-150.7 (q, J=244 Hz); Carbon atom bonding to the fluorine (meta-position relative to the methoxy). 140.2-142.8 (q, J=245 Hz); Carbon atom bonding to the oxygen on the benzene ring 146.0-146.1 (q); Carbon atom bonding to the methylene on the benzene ring 128.2-128.3 (d)

4.

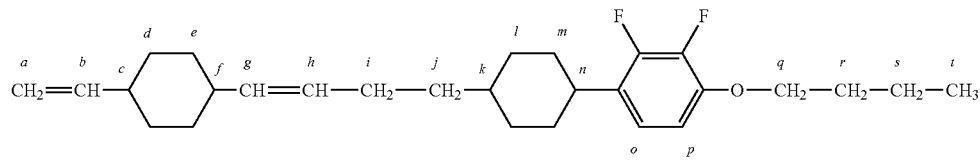

¹H NMR spectrum:
a 5.32-5.42 (2H, m); b 4.87-4.90 (1H, m); c, f 1-2 (2H, m); d, e 1-2 (8H, m) (8 hydrogens of methylene on the cyclohexyl); g 4.94-4.99 (1H, d, J=17.32 Hz, indicating that the double bond is trans-substituted); h 5.73-5.82 (1H, m); i, j 1-2 (4H, m); k 1-2 (1 H, m); l, m 1-2 (8H, m); n 2.70-2.76 (1H, m); o 6.63-6.68 (1H, m); p 6.80-6.85 (1H, m); q 3.99-4.02 (2H, t); r, s 1-2 (4H, m); t 0.92-0.99 (3H, t)

¹³C NMR spectrum:
a 111.7; b, g, h 128.7, 136.0, 144.6; o 109.49-109.51 (d); p 120.3-120.4 (t); q 69.63; s 19.10; t 13.76; Carbon atom bonding to the fluorine (ortho-position relative to the methoxy) 148.1-150.7 (q, J=244 Hz); Carbon atom bonding to the fluorine (meta-position relative to the methoxy) 140.3-142.9 (q, J=245 Hz); Carbon atom bonding to the oxygen on the benzene ring 146.3-146.4 (m); Carbon atom bonding to the methylene on the benzene ring 128.2

Application Example

A parent liquid crystal M was formulated with the following formulation:
PCH501 0.20
PCH50 0.20
VHHP1 0.30
VHHPFF 0.30
wherein, M was a parent liquid crystal, M-1 to M-3 were all obtained by mixing 80% of the parent liquid crystal with 20% of single crystal, with the following parameters:

TABLE 1

| Mixed crystal | $T_{(S-N)}$ (° C.) | $T_{N-Iso}$ (° C.) |
| --- | --- | --- |
| M | ≦0.0 | 88.0 |
| M-1(VCV2CW02) | ≦-6.0 | 94.5 |

TABLE 1-continued

| Mixed crystal | $T_{(S-N)}$ (° C.) | $T_{N-Iso}$ (° C.) |
| --- | --- | --- |
| M-2(VCV2CW04) | ≦-6.0 | 92.4 |
| M-3(VCV2CW01) | ≦-6.0 | 91.9 |

From the data of Table 1, it could be seen that the addition of the series of single crystals could enhance effectively the clearing point and reduce the crystalline temperature.

Moreover, after the parent liquid crystal and M-1 to M-3 were simultaneously placed at a lower temperature for the precipitation of crystals, M could not recover to the original status at room temperature, while there was a small amount of crystal. M-1 to M-3 recovered to the original status of liquid crystals at room temperature very soon, without precipitation of crystals. It thus can be seen that these liquid crystals were excellently miscible with other liquid crystals.

What is claimed is:

1. A new nematic phase liquid crystal compound with a negative dielectric constant, having a structure represented by the following general formula (1):

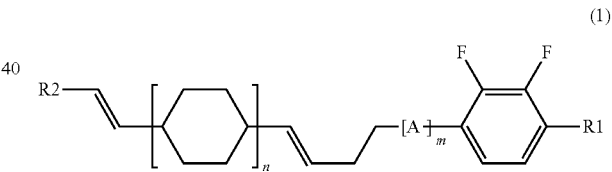

Wherein:
R1 represents a hydrogen atom or a linear alkyl having 1 to 8 carbon atoms or a linear alkenyl having 2 to 8 carbon atom, or alternatively, R1 represents an alkoxy or an alykenoxy formed by substituting one or nonadjacent two CH₂ in the above linear alkyl or linear alkenyl with an oxygen atom, wherein 0 to 4 hydrogen atoms of R1 group can be substituted with fluorine;

R2 represents hydrogen atom or a linear alkyl having 1 to 8 carbon atoms, or alternatively, R2 represents a linear fluoroalkyl having 1 to 8 carbon atoms, in which the linear fluoroalkyl can have 1 to 4 fluorine atoms;

A represents a benzene ring or 1,4-cyclohexane ring, wherein if A is the benzene ring then there may be 0 to 4 hydrogen atoms on the benzene ring being substituted with fluorine;

n=1 to 2, m=0 to 2.

2. The nematic phase liquid crystal compound according to claim 1, wherein R2 is hydrogen, m=0, R1 is a linear alkoxy having 1 to 4 carbon atoms.

3. The nematic phase liquid crystal compound according to claim 1, wherein R2 is hydrogen, A is 1,4-cyclohexane ring, m=1, and R1 is a linear alkoxy having 1 to 4 carbon atoms.

4. A mixture of liquid crystals comprising the nematic phase liquid crystal compound according to claim 1, wherein the content of the nematic phase liquid crystal compound according to claim 1 is from 1 to 60%.

* * * * *